US012657358B2

(12) United States Patent
Neumann Barros Ferreira et al.

(10) Patent No.: US 12,657,358 B2

(45) Date of Patent: Jun. 16, 2026

(54) NEURAL NETWORK PREDICTIONS OF FLUID FLOW IN POROUS MEDIA

(71) Applicant: INTERNATIONAL BUSINESS MACHINES CORPORATION, Armonk, NY (US)

(72) Inventors: Rodrigo Neumann Barros Ferreira, Rio de Janeiro (BR); Jaione Tirapu Azpiroz, Rio de Janeiro (BR); Ronaldo Giro, São Paulo (BR); Mathias B Steiner, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 17/708,319

(22) Filed: Mar. 30, 2022

(65) Prior Publication Data

US 2023/0315956 A1    Oct. 5, 2023

(51) Int. Cl.
G06F 30/28 (2020.01)
G06F 30/27 (2020.01)
(Continued)

(52) U.S. Cl.
CPC .............. G06F 30/28 (2020.01); G06F 30/27 (2020.01); G06N 3/08 (2013.01); G06F 2113/08 (2020.01)

(58) Field of Classification Search
CPC ...... G06F 30/28; G06F 30/27; G06F 2113/08; G06F 2111/10; G06N 3/08; G06N 3/0464; G06N 3/09
See application file for complete search history.

(56) References Cited

U.S. PATENT DOCUMENTS

| | | | |
|---|---|---|---|
| 10,648,292 B2 | 5/2020 | Bryant et al. | |
| 10,830,713 B2 | 11/2020 | Zhang | |

(Continued)

FOREIGN PATENT DOCUMENTS

| | | |
|---|---|---|
| CN | 103699664 | 4/2014 |
| CN | 105160058 | 12/2015 |

(Continued)

OTHER PUBLICATIONS https://www.merriam-webster.com/dictionary/convolution, 1 page, Aug. 15, 2024 (Year: 2024).*

(Continued)

*Primary Examiner* — Tung S Lau

(74) *Attorney, Agent, or Firm* — Seed Intellectual Property Law Group LLP

(57) ABSTRACT

Systems and methods for predicting fluid flow of porous media are provided. In implementations, a method includes: accessing, by a computing device, a capillary network representation of a porous medium sample; generating, by the computing device, a set of simplified network representations from the capillary network representation; determining, by the computing device, simulated fluid flow properties of each of the simplified network representations using a simulator to perform fluid flow simulations; and training, by the computing device, a neural network (NN) model utilizing the set of simplified network representations as inputs and the simulated fluid flow properties as model targets, thereby generating a trained NN model for predicting fluid flow properties of the porous medium.

20 Claims, 10 Drawing Sheets

(51) Int. Cl.
  G06N 3/08        (2023.01)
  G06F 113/08      (2020.01)

(56)                References Cited

U.S. PATENT DOCUMENTS

| | | | |
|---|---|---|---|
| 11,704,457 B2 * | 7/2023 | Riasi | G06F 30/23 |
| | | | 703/2 |
| 2005/0256643 A1 * | 11/2005 | Boitnott | G01V 11/00 |
| | | | 702/6 |
| 2013/0096900 A1 | 4/2013 | Usadi et al. | |
| 2014/0019053 A1 | 1/2014 | de Prisco | |
| 2018/0252076 A1 | 9/2018 | Bryant et al. | |
| 2018/0253514 A1 * | 9/2018 | Bryant | G06F 30/20 |
| 2020/0320386 A1 | 10/2020 | Filippov et al. | |

FOREIGN PATENT DOCUMENTS

| | | |
|---|---|---|
| CN | 103822865 | 5/2016 |
| CN | 107018011 | 8/2017 |
| CN | 108173903 | 6/2018 |
| CN | 108988346 | 12/2018 |
| CN | 109120452 | 1/2019 |
| CN | 109902846 | 6/2019 |
| CN | 110365519 | 10/2019 |
| CN | 110851655 | 2/2020 |
| CN | 111460596 | 7/2020 |
| CN | 111950192 | 11/2020 |
| CN | 111950193 | 11/2020 |
| CN | 112187658 | 1/2021 |
| CN | 112329358 | 2/2021 |
| CN | 112801499 | 5/2021 |
| CN | 112967238 | 6/2021 |
| CN | 113139989 | 7/2021 |
| CN | 113947026 | 1/2022 |
| CN | 119013670 A | 11/2024 |
| WO | 2013009512 | 1/2013 |
| WO | 2021019361 | 2/2021 |
| WO | 2023/185858 A1 | 10/2023 |

OTHER PUBLICATIONS https://www.arm.com/glossary/convolutional-neural-network, 1 page, What Is a Convolutional Neural Network (Year: 2025).*
https://developer.nvidia.com/discover/convolutional-neural-network, 5 pages (Year: 2025).*

International Search Report and Written Opinion for PCT/CN2023/084412 dated Jun. 23, 2023; 8 Pages.
Mell et al., "The NIST Definition of Cloud Computing", NIST, Special Publication 800-145, Sep. 2011, 7 pages.
Garttner et al., "Estimating permeability of 3D micro-CT images by physics-informed CNNs based on DNS," https://arxiv.org/abs/2109.01818, Sep. 4, 2021, 23 pages.
Neumann et al., "High accuracy capillary network representation in digital rock reveals permeability scaling functions." Scientific Reports, 2021, 8 pages.
Miao et al., "A new way to parameterize hydraulic conductances of pore elements: A step towards creating pore-networks without pore shape simplifications," Advances in Water Resources, Nov. 28, 2016, 29 pages.
Santos et al., "PoreFlow-Net: A 3D convolutional neural network to predict fluid flow through porous media," Advances in Water Resources, Nov. 20, 2019, 12 pages.
Rabbani et al., "Estimation of carbonates permeability using pore network parameters extracted from thin section images and comparison with experimental data," J. Natural Gas Science & Engineering, Oct. 25, 2016, 30 pages.
Jia et al., "A Pore-Network-Modeling Approach to Predict Petrophysical Properties of Diatomaceous Reservoir Rock," SPE Res Eval & Eng 10 (06), Dec. 20, 2007, 12 pages.
Van der Linden, "Machine learning framework for analysis of transport through complex networks in porous, granular media: A focus on permeability", American Physical Society, 2016, 16 pages.
Wu, "Predicting Effective Diffusivity of Porous Media from Images by Deep Learning", Scientific Reports, 2019, 12 pages.
Sudakov, "Driving Digital Rock towards Machine Learning: predicting permeability with Gradient Boosting and Deep Neural Networks", Mar. 14, 2018, 22 pages.
Liu, "Using machine learning to predict permeability in porous materials", 2019, 13 pages.
Zhang et al., "Graph convolutional networks: a comprehensive review", Computational Social Networks, 2019, 23 pages.
Jepsen, "How to do Deep Learning on Graphs with Graph Convolutional Networks", https://towardsdatascience.com/how-to-do-deep-learning-on-graphs-with-graph-convolutional-networks-7d2250723780, Sep. 18, 2018, 13 pages.
Rabbani et al., "Hybrid pore-network and Lattice-Boltzmann permeability modelling accelerated by machine learning", Advances in Water Resources, Dec. 30, 2018, 41 pages.
Xie, et al., "Crystal Graph Convolutional Neural Networks for an Accurate and Interpretable Prediction of Material Properties", Phys. Rev. Lett., Apr. 6, 2018, 7 pages.

* cited by examiner

Figure 4:
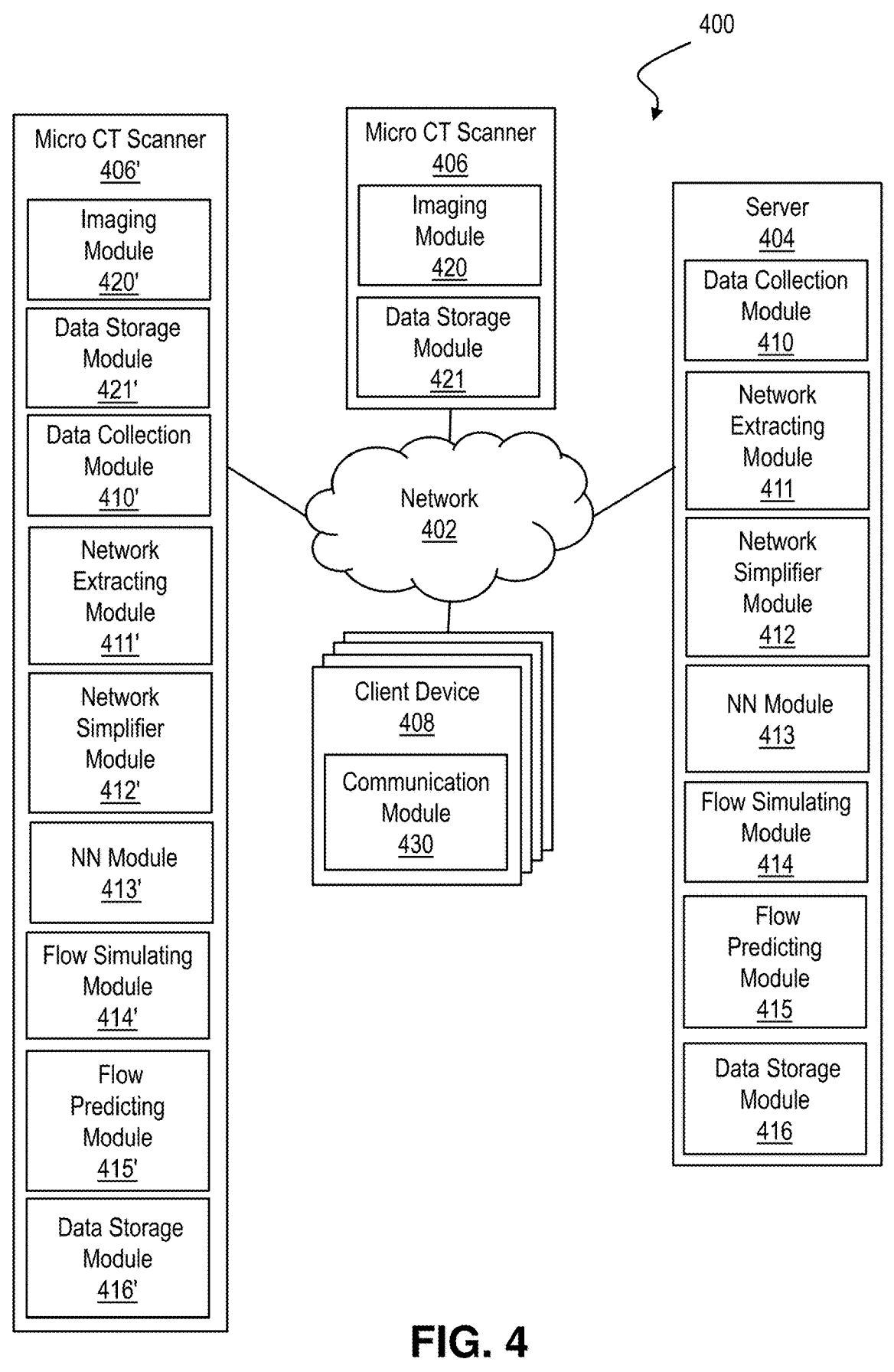

400

Micro CT Scanner
406'

Imaging
Module
420'

Data Storage
Module
421'

Data Collection
Module
410'

Network
Extracting
Module
411'

Network
Simplifier
Module
412'

NN Module
413'

Flow Simulating
Module
414'

Flow
Predicting
Module
415'

Data Storage
Module
416'

Micro CT Scanner
406

Imaging
Module
420

Data Storage
Module
421

Network
402

Client Device
408

Communication
Module
430

Server
404

Data Collection
Module
410

Network
Extracting
Module
411

Network
Simplifier
Module
412

NN Module
413

Flow Simulating
Module
414

Flow
Predicting
Module
415

Data Storage
Module
416

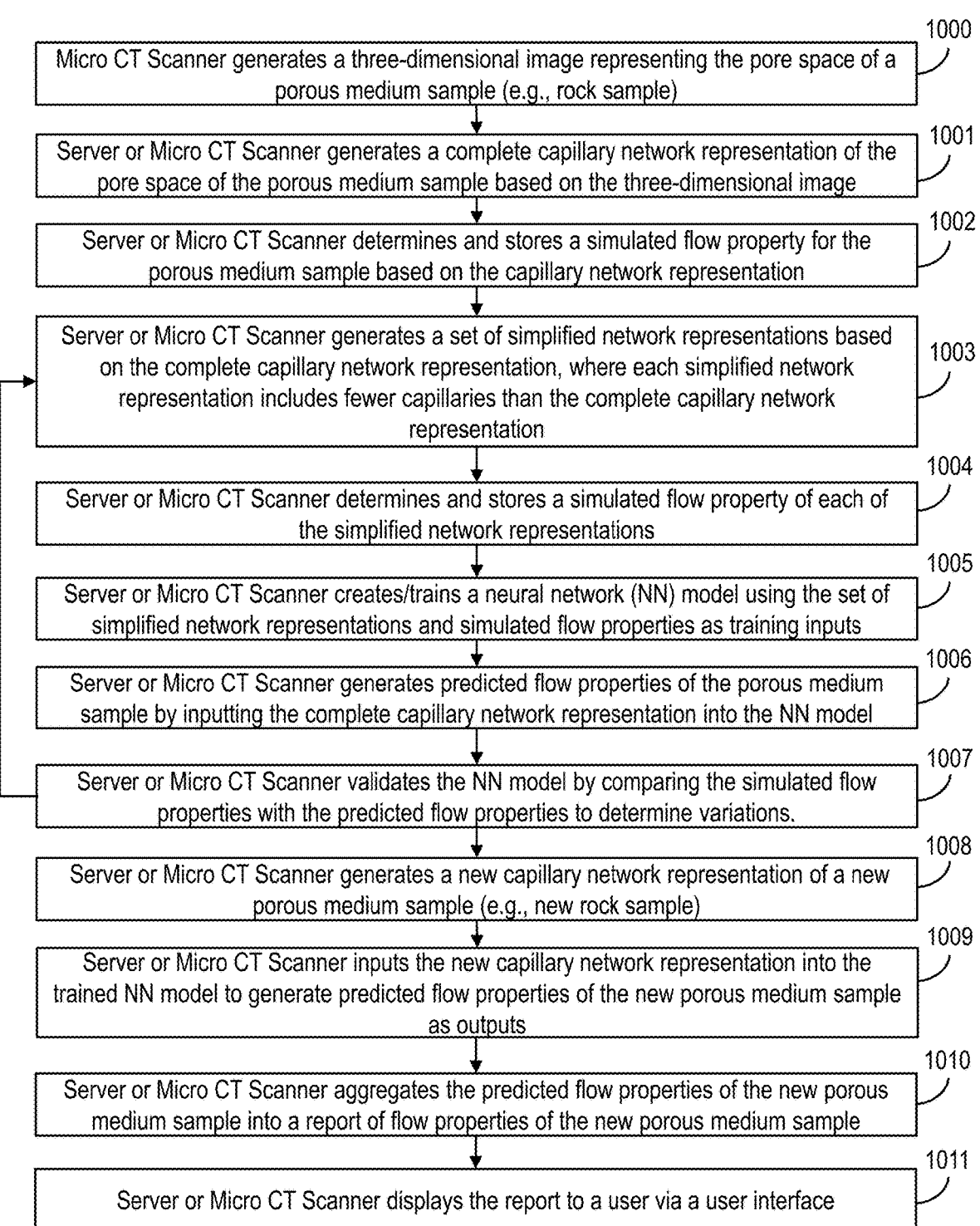

1000

Micro CT Scanner generates a three-dimensional image representing the pore space of a porous medium sample (e.g., rock sample)

1001

Server or Micro CT Scanner generates a complete capillary network representation of the pore space of the porous medium sample based on the three-dimensional image

1002

Server or Micro CT Scanner determines and stores a simulated flow property for the porous medium sample based on the capillary network representation

1003

Server or Micro CT Scanner generates a set of simplified network representations based on the complete capillary network representation, where each simplified network representation includes fewer capillaries than the complete capillary network representation

1004

Server or Micro CT Scanner determines and stores a simulated flow property of each of the simplified network representations

1005

Server or Micro CT Scanner creates/trains a neural network (NN) model using the set of simplified network representations and simulated flow properties as training inputs

1006

Server or Micro CT Scanner generates predicted flow properties of the porous medium sample by inputting the complete capillary network representation into the NN model

1007

Server or Micro CT Scanner validates the NN model by comparing the simulated flow properties with the predicted flow properties to determine variations.

1008

Server or Micro CT Scanner generates a new capillary network representation of a new porous medium sample (e.g., new rock sample)

1009

Server or Micro CT Scanner inputs the new capillary network representation into the trained NN model to generate predicted flow properties of the new porous medium sample as outputs

1010

Server or Micro CT Scanner aggregates the predicted flow properties of the new porous medium sample into a report of flow properties of the new porous medium sample

1011

Server or Micro CT Scanner displays the report to a user via a user interface

FIG. 10

NEURAL NETWORK PREDICTIONS OF FLUID FLOW IN POROUS MEDIA

BACKGROUND

Aspects of the present invention relate generally to fluid flow analysis of porous media and, more particularly, to neural network (NN) predictions of fluid flow in porous media.

Permeability is a key parameter for quantifying fluid flow in porous media (e.g., rocks). Various methods have been developed to determine permeability and other features of geological samples. One method includes x-ray microtomography imaging of porous media samples. In general x-ray microtomography or micro computed tomography (micro-CT) uses x-rays to create images of cross-sections of a physical object that can be used to recreate a virtual three-dimensional (3D) representation without destroying the original physical object. Another method performs image processing of a 3D representation generated from x-ray microtomography to generate a capillary network representation of a physical object. A fluid flow simulation can be performed on the capillary network representation to predict fluid flow through the physical object.

SUMMARY

In a first aspect of the invention, there is a computer-implemented method including: accessing, by a computing device, a capillary network representation of a porous medium sample; generating, by the computing device, a set of simplified network representations from the capillary network representation; determining, by the computing device, simulated fluid flow properties of each of the simplified network representations using a simulator to perform fluid flow simulations; and training, by the computing device, a neural network (NN) model utilizing the set of simplified network representations as inputs and the simulated fluid flow properties as model targets, thereby generating a trained NN model for predicting fluid flow properties of the porous medium.

In another aspect of the invention, there is a computer program product including one or more computer readable storage media having program instructions collectively stored on the one or more computer readable storage media. The program instructions are executable to: access a capillary network representation, wherein the capillary network representation is a three-dimensional (3D) network of interconnected capillaries representing interconnecting pore structures of a 3D micro-CT scanner model of a porous medium sample; generate a set of simplified network representations from the capillary network representation, wherein each simplified network representation in the set of simplified network representations comprises a two dimensional (2D) or 3D network of interconnected capillary structures that represents a subset of the interconnected capillary structures of the capillary network representation; determine simulated fluid flow properties of each of the simplified network representations using a physics-based simulator to perform fluid flow simulations; and train a neural network (NN) model utilizing the set of simplified network representations as inputs and the simulated fluid flow properties as model targets, thereby generating a trained NN model for predicting fluid flow properties.

In another aspect of the invention, there is system including a processor, a computer readable memory, one or more computer readable storage media, and program instructions collectively stored on the one or more computer readable storage media. The program instructions are executable to: access a capillary network representation, wherein the capillary network representation is a three-dimensional (3D) network of interconnected capillaries representing interconnecting pore structures of a 3D micro-CT scanner model of a porous medium sample; generate a set of simplified network representations from the capillary network representation, wherein each simplified network representation in the set of simplified network representations comprises a two dimensional (2D) or 3D network of interconnected capillary structures that represents a subset of the interconnected capillary structures of the capillary network representation; determine simulated fluid flow properties of each of the simplified network representations using a physics-based simulator to perform fluid flow simulations; train a neural network (NN) model utilizing the set of simplified network representations as inputs and the simulated fluid flow properties as model targets, thereby generating a trained NN model for predicting fluid flow properties; and input a new capillary network representation of a new porous medium sample into the trained NN model, thereby generating predicted fluid flow properties of the new porous medium sample.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 4 shows a block diagram of an exemplary environment in accordance with aspects of the invention.

FIG. 6 is an illustrative example of generating predicted flow properties according to embodiments of the invention.

FIG. 10 shows a flowchart of an exemplary method in accordance with aspects of the invention.

DETAILED DESCRIPTION

Figure 1:
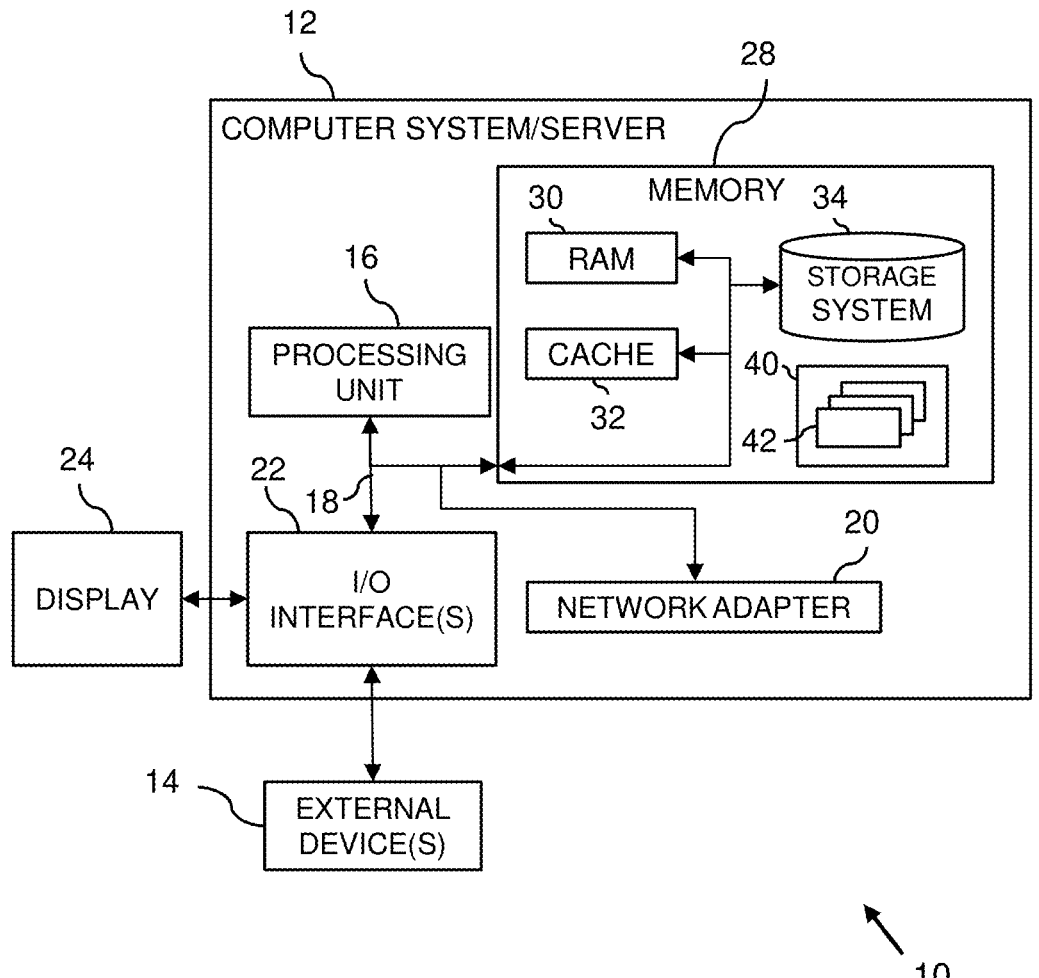
FIG. 1 depicts a cloud computing node according to an embodiment of the present invention.

Aspects of the present invention relate generally to fluid flow analysis of porous media and, more particularly, to neural network (NN) predictions of fluid flow in porous media. In implementations, a porous medium (e.g., rock) sample is subjected to x-ray microtomography imaging by a micro computed tomography (micro-CT) scanner, thereby generating a three-dimensional (3D) representation or image cube representing pore space of the porous medium sample. In embodiments, a computing device uses a network extraction routine to process the 3D representation and generate a capillary network representation of the pore space of the sample, applies a physics-based flow simulator to the capillary network representation to simulate the flow of a select fluid through the sample under select conditions (e.g., pressure, temperature, etc.) to determine a flow property of interest (e.g., permeability, flow rates, residual fluid saturation, etc.), and stores the flow property of interest for later validation of a surrogate NN model.

In embodiments, a computing device applies a network simplification routine to generate a set of simplified network representations (e.g., 50-100 representations) from the capillary network representation, where the set of simplified network representations is much smaller than the capillary network representation (e.g., 3 or more orders of magnitude less). In implementations, for each simplified network representation, a physics-based simulator performs a flow simulation and obtains simulated flow properties of the individual simplified network representations. In aspects of the invention, a computing device performs a NN training routine utilizing the simplified network representations as inputs and their simulated flow properties as model targets to create a trained NN model configured to generate predicted flow properties as an output based on an input of a capillary network representation(s). In embodiments, the computing device compares simulated flow properties to predicted flow properties for NN model validation purposes.

Execution of flow simulations based on capillary network representations can require a large number of computational resources. Implementations of the invention provide an improved digital image-based modeling system that utilizes significantly less computational resources to estimate flow properties of a porous medium sample than are necessary to generate flow property estimates directly from a capillary network representation. In embodiments, an improved digital imaging system (e.g., a micro-CT scanner) is provided to predict flow properties of a porous medium sample based on digital image processing and the use of a trained NN model.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
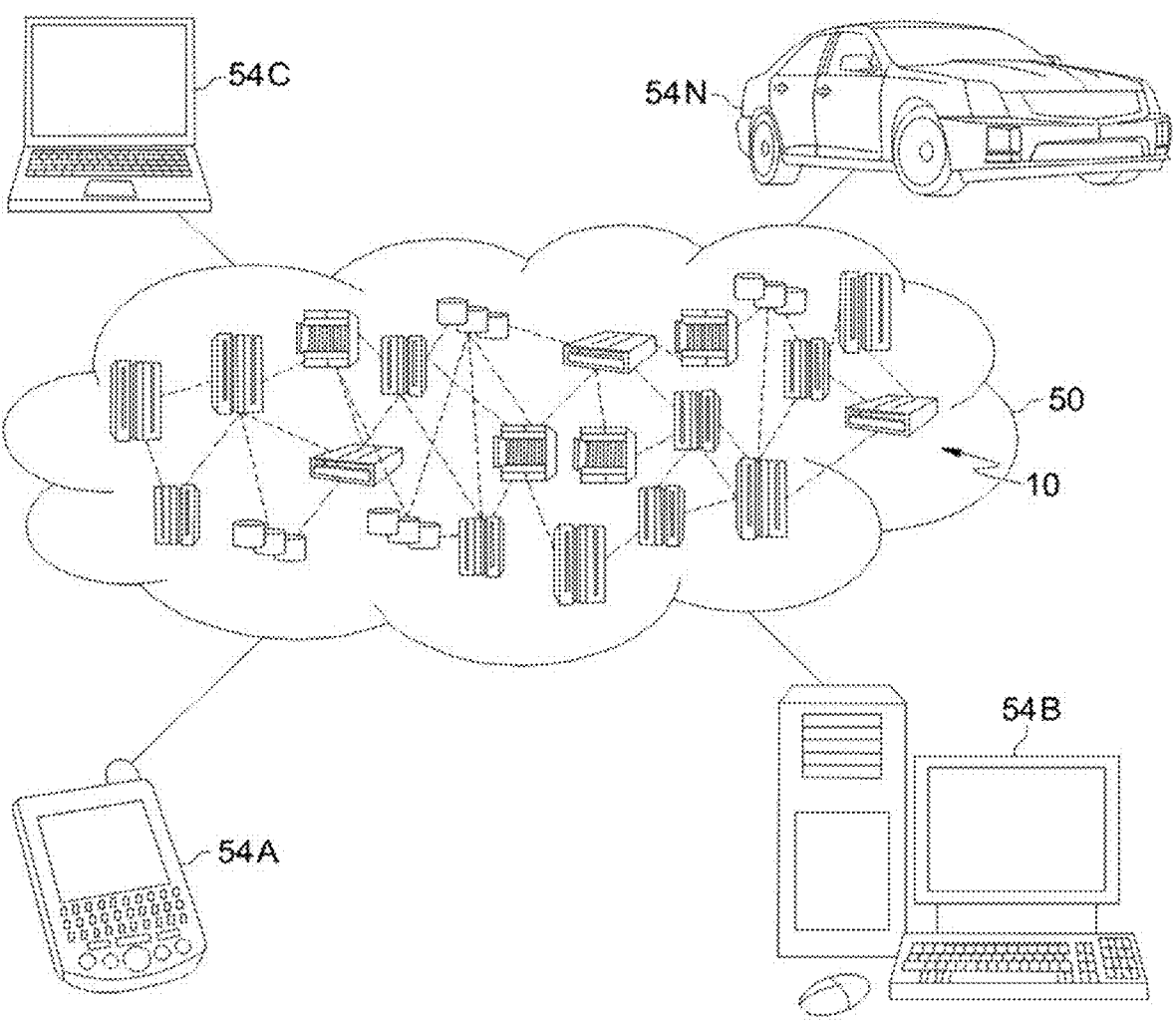
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
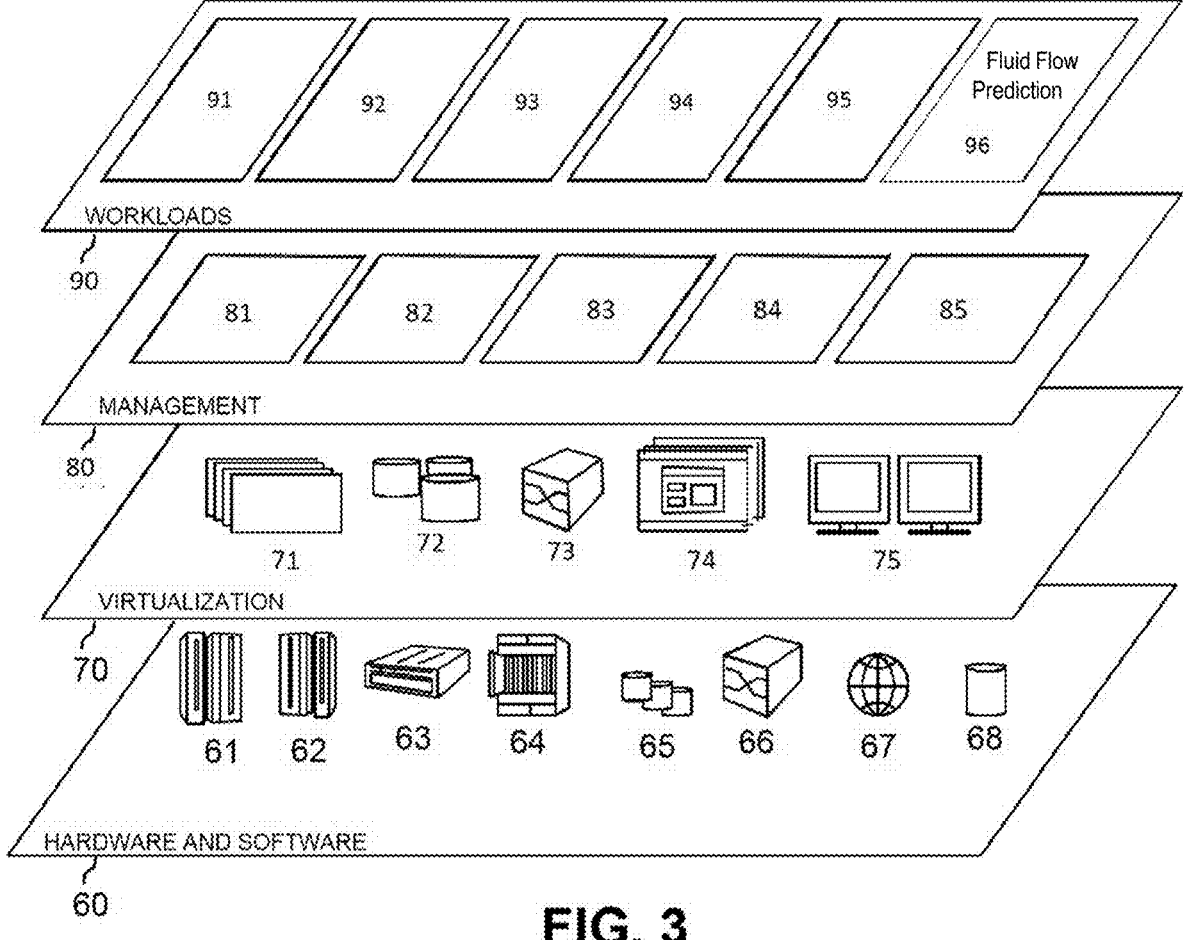
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and fluid flow prediction 96.

Implementations of the invention may include a computer system/server 12 of FIG. 1 in which one or more of the program modules 42 are configured to perform (or cause the computer system/server 12 to perform) one of more functions of the fluid flow prediction 96 of FIG. 3. For example, the one or more of the program modules 42 may be configured to: access a capillary network representation, wherein the capillary network representation is a three-dimensional (3D) network of interconnected capillaries representing interconnecting pore structures of a 3D micro-CT scanner model of a porous medium sample; generate a set of simplified network representations from the capillary network representation, wherein each simplified network representation in the set of simplified network representations comprises a two dimensional (2D) or 3D network of interconnected capillary structures that represents a subset of the interconnected capillary structures of the capillary network representation; determine simulated fluid flow properties of each of the simplified network representations using a physics-based simulator to perform fluid flow simulations; train a NN model utilizing the set of simplified network representations as inputs and the simulated fluid flow properties as model targets, thereby generating a trained NN model for predicting fluid flow properties; and input a new capillary network representation of a new porous medium sample into the trained NN model, thereby generating predicted fluid flow properties of the new porous medium sample.

FIG. 4 shows a block diagram of an exemplary environment 400 in accordance with aspects of the invention. In embodiments, the environment 400 includes a network 402 enabling communication between one or more of: a server 404, a micro computed tomography (micro-CT) scanner 406, a micro-CT scanner 406', and one or more client devices 408. The server 404, the micro-CT scanner 406, the micro-CT scanner 406', and the one or more client devices 408 may each comprise the computer system/server 12 of FIG. 1, or elements thereof. The server 404, the micro-CT scanner 406, the micro-CT scanner 406', and the one or more client devices 408 may each be computing nodes 10 in the cloud computing environment 50 of FIG. 2. The one or more client devices 408 may be local computing devices used by cloud consumers in the cloud computing environment 50 of FIG. 2 (e.g., PDA or cellular telephone 54A, desktop computer 54B, or laptop computer 54C), for example.

Implementations of the invention utilize the micro-CT scanner 406 in communication with a remote server 404 via the network 402. In embodiments, the server 404 provides cloud-based digital image analysis services to users of the environment 400 based on x-ray microtomography results from one or more remote micro-CT scanners 406. Other implementations of the invention utilize a micro-CT scanner 406' to both generate the x-ray microtomography results and perform a digital image analysis according to methods of the invention.

In embodiments, the server 404 comprises one or more modules, each of which may comprise one or more program modules such as program modules 42 described with respect to FIG. 1. In the example of FIG. 4, the server 404 includes a data collection module 410, a network extracting module 411, a network simplifier module 412, a neural network (NN) module 413, a flow simulating module 414, a flow prediction module 415, and a data storage module 416, each of which may comprise one or more program module(s) 42 of FIG. 1, for example.

In embodiments, the micro-CT scanner 406 and/or the micro-CT scanner 406' comprise one or more modules, each of which may comprise one or more program modules such as program modules 42 described with respect to FIG. 1. In the example of FIG. 4, the micro-CT scanner 406 includes an imaging module 420 and a data storage module 421, each of which may comprise one or more program module(s) 42 of FIG. 1, for example. In implementations, the imaging module 420 is configured to generate digital image data using x-ray microtomography methods, and store the digital image data (e.g., a 3D model of pore space within a physical porous medium) in the data storage module 421.

In implementations, the micro-CT scanner 406 and/or the micro-CT scanner 406' comprise special purpose computing devices configured to generate and process 3D models of physical objects derived from x-ray microtomography. In general, x-ray microtomography or micro-CT uses x-rays to create digital images of cross-sections of a physical object that can be used to recreate a virtual model (3D model) without destroying the original object. The preface "micro" is used to indicate that the pixel sizes of the cross-sections are in the micrometer range. Various micro-CT scanning systems may be utilized in accordance with embodiments of the invention, and embodiments of the invention are not intended to be limited to a particular micro-CT scanning system.

In implementations, the data collection module 410 of the server 404 is configured to obtain digital image data (e.g., a 3D model) from the micro-CT scanner 406 (e.g., from the imaging module 420 or the data storage module 421). In embodiments, the network extracting module 411 of the server 404 is configured to generate a digital capillary network representation of a 3D model using a network extraction routine, where the digital capillary network representation includes a network of interconnected capillaries based on pore space in the 3D model.

In implementations, the network simplifier module 412 of the server 404 is configured to generate a plurality of simplified network representations based on the capillary network representation using a network simplification routine, wherein each of the simplified network representations include a number of interconnected capillaries that is smaller than the number of interconnected capillaries in the capillary network representation.

In aspects, the NN module 413 is configured to create and train an NN model using the plurality of simplified networks as an input and simulated flow properties determined from those simplified networks as model targets. In implementations, the flow simulating module 414 of the server 404 is configured to determine one or more simulated flow properties of a porous medium sample by simulating a flow of a fluid under predetermined conditions through pore space of the porous medium.

In implementations, flow predicting module 415 is configured to generate predicted flow properties of a porous medium sample as an output of the NN model by inputting a capillary network representation of the porous medium sample into the trained NN model. In embodiments, the NN module 413 is also configured to validate the NN model by comparing simulated flow properties with the predicted flow properties, wherein divergence of the simulated flow properties from the predicted flow properties indicates inaccuracies in the NN model. In embodiments, the server 404 stores generated data in the data storage module 416, such as predicted flow properties, simulated flow properties, 3D models, and NN models.

In embodiments, the micro-CT scanner 406' performs functions of both the micro-CT scanner 406 and the server 404. In implementations, the micro-CT scanner 406' comprises one or more modules, each of which may comprise one or more program modules such as program modules 42 described with respect to FIG. 1. In aspects of the invention, the micro-CT scanner 406' includes modules corresponding to modules of the micro-CT scanner 406 and server 404. In the example of FIG. 4, the micro-CT scanner 406' includes an imaging module 420' and a data storage module 421' with functions corresponding to respective modules 420 and 421 of the micro-CT scanner 406. Additionally, the micro-CT scanner 406' includes a data collection module 410', a network extracting module 411', a network simplifier module 412', a neural network (NN) module 413', a flow simulating module 414', a flow prediction module 415', and a data storage module 416', with functions corresponding to respective modules 410-416 of the server 404.

The server 404, the micro-CT scanner 406, the micro-CT scanner 406', and the one or more client devices 408 may each include additional or fewer modules than those shown in FIG. 4. In embodiments, separate modules may be integrated into a single module. Additionally, or alternatively, a single module may be implemented as multiple modules. Moreover, the quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4.

Figure 5:
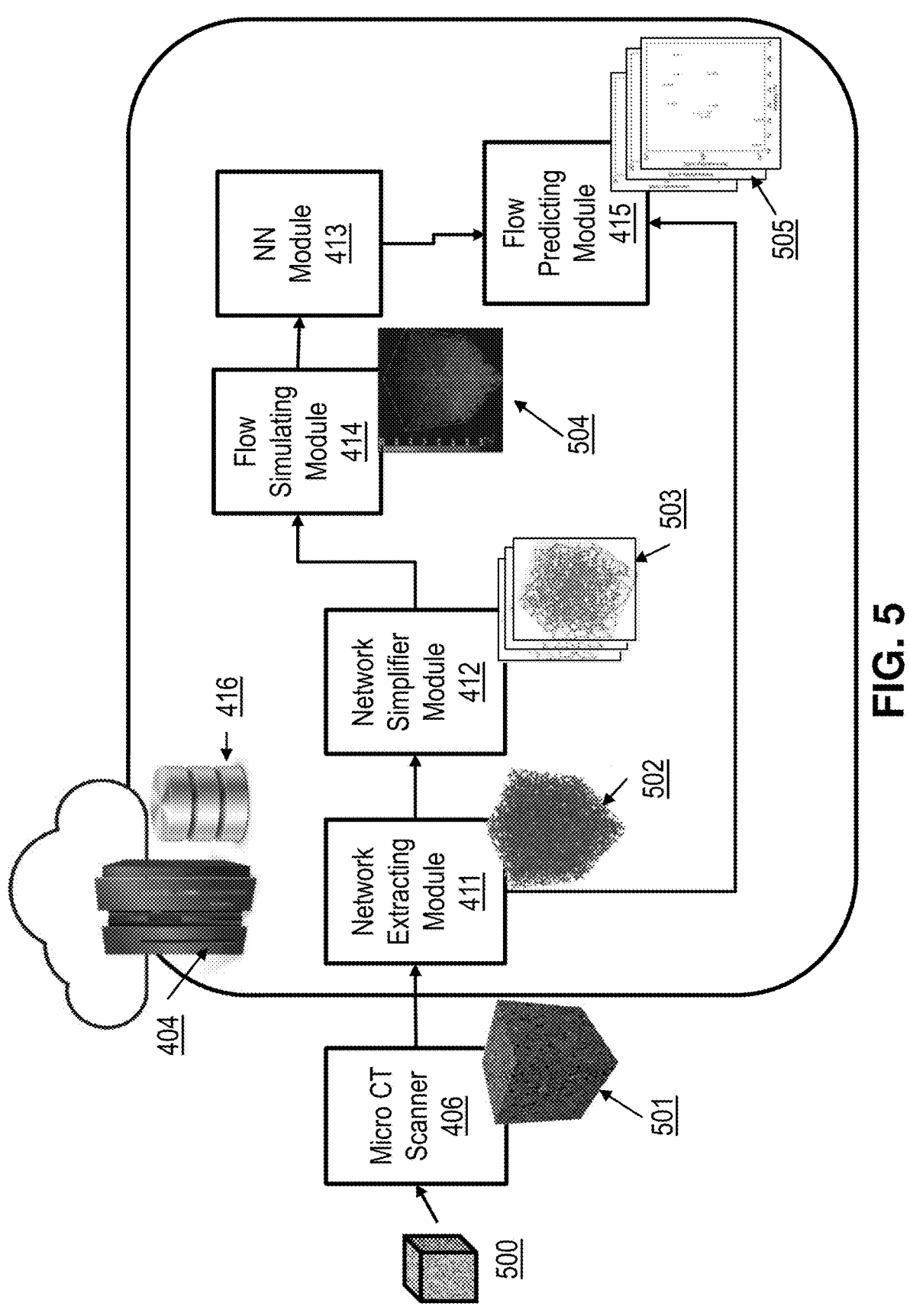
FIG. 5 is a flow diagram providing an overview of a porous media modeling system according to embodiments of the invention.

FIG. 5 is a flow diagram providing an overview of a porous media modeling system according to embodiments of the invention. Steps illustrated in FIG. 5 may be carried out in the environment of FIG. 4 and are described with reference to elements depicted in FIG. 4.

In implementations, a porous medium sample (e.g., a rock sample) 500 is scanned by the micro-CT scanner 406 to generate a 3D model 501 of the sample. In embodiments, the network extracting module 411 of the server 404 generates a capillary network representation 502 of the 3D model 501 using a network extraction routine. The term capillary network representation as used herein refers to a 3D network of interconnected capillary structures, wherein the interconnected capillary structures represent interconnecting pore structures of a micro-CT scanner 3D model (e.g., 3D model 501). The network simplifier module 412 of the server 404 utilizes the capillary network representation 502 to generate a plurality of simplified network representations indicated at 503, where the simplified network representations 503 each include a number of capillaries that is less than the number of capillaries in the capillary network representation 502. The number of simplified network representations generated may vary. In implementations, the number of simplified network representations generated depends on how many simplified network representations are needed to generate an accurate flow prediction, which is determined through validating different iterations of the flow prediction method. As an example, 50-100 simplified network representations 503 may be generated to obtain an accurate flow prediction according to embodiments of the invention.

The term simplified network representations as used herein refers to a two dimensional (2D) or 3D network of interconnected capillary structures, that represents a subset of the interconnected capillary structures of a complete capillary network representation 502. In implementations, each of the simplified network representations 503 comprise a substantially smaller capillary network than the capillary network representation 502, and are optimized to match fluid-relevant morphological properties (e.g., porosity, capillary diameter distribution, etc.) of the capillary network representation 502.

With continued reference to FIG. 5, the flow simulating module 414 of the server 404 determines simulated flow properties 504 for each of the simplified network representations 503. The NN module 413 utilizes the simplified network representations 503 and the simulated flow properties 504 to train a NN model. The flow predicting module 415 determines predicted flow properties 505 of the porous medium sample 500 by inputting the capillary network representation 502 into the trained NN model. In implementations, the predicted flow properties 505 are output from the NN model as numerical representations of flow properties of the porous medium sample 500. A visualization of a numerical representation of flow properties is depicted at 600 in FIG. 6.

Figure 6:
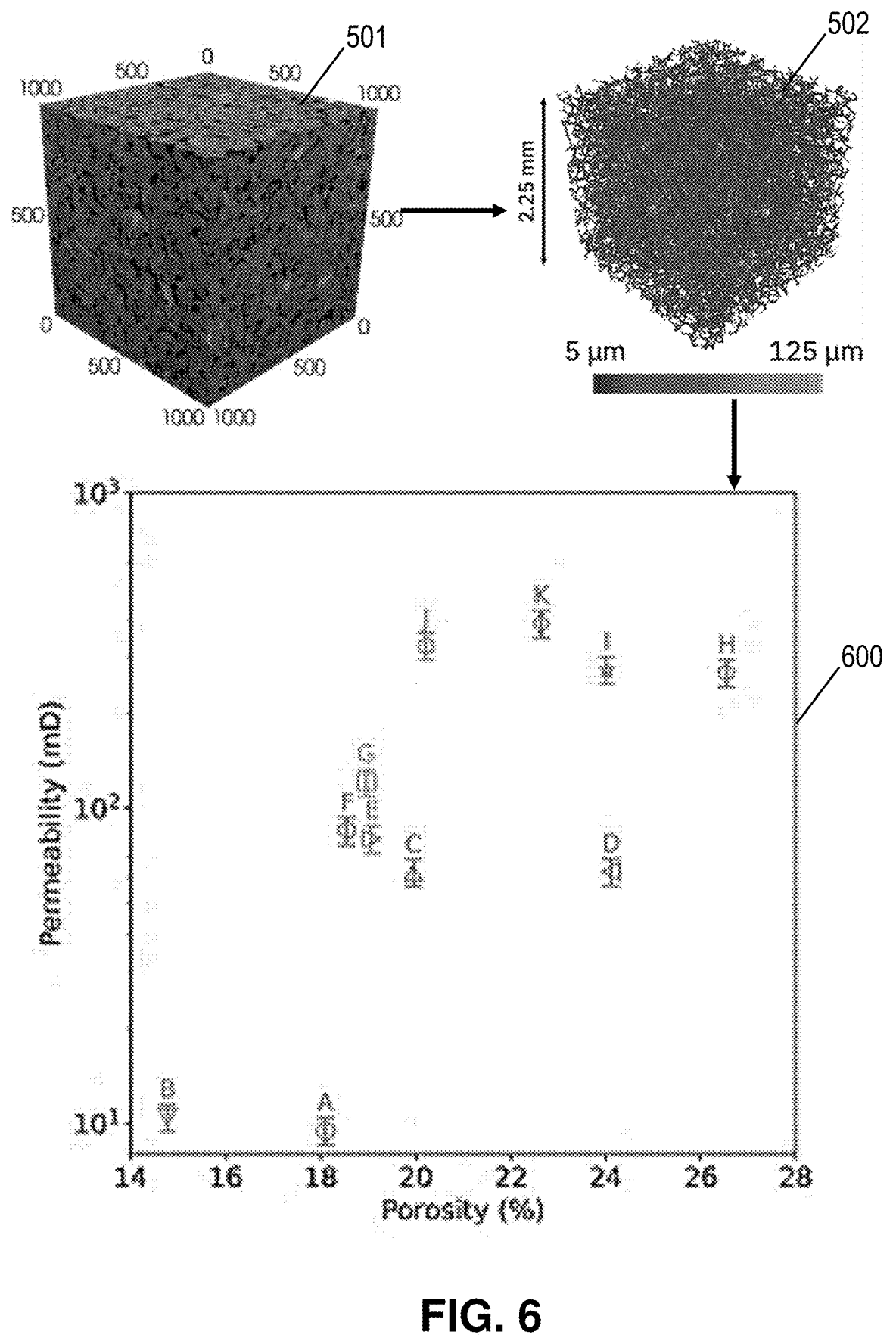

FIG. 6 is an illustrative example of predicted flow properties generated according to embodiments of the invention. In the example of FIG. 6, a 3D model 501 of porosity of a porous medium sample 500 is utilized to generate a capillary network representation 502 including capillaries with diameters between 5-125 μm generated based on the porosity of the 3D model 501. The capillary network representation 502 is input into the trained NN model according to embodiments of the invention, which generates predicted flow properties in the form of a permeability and porosity graph 600.

Figure 7:
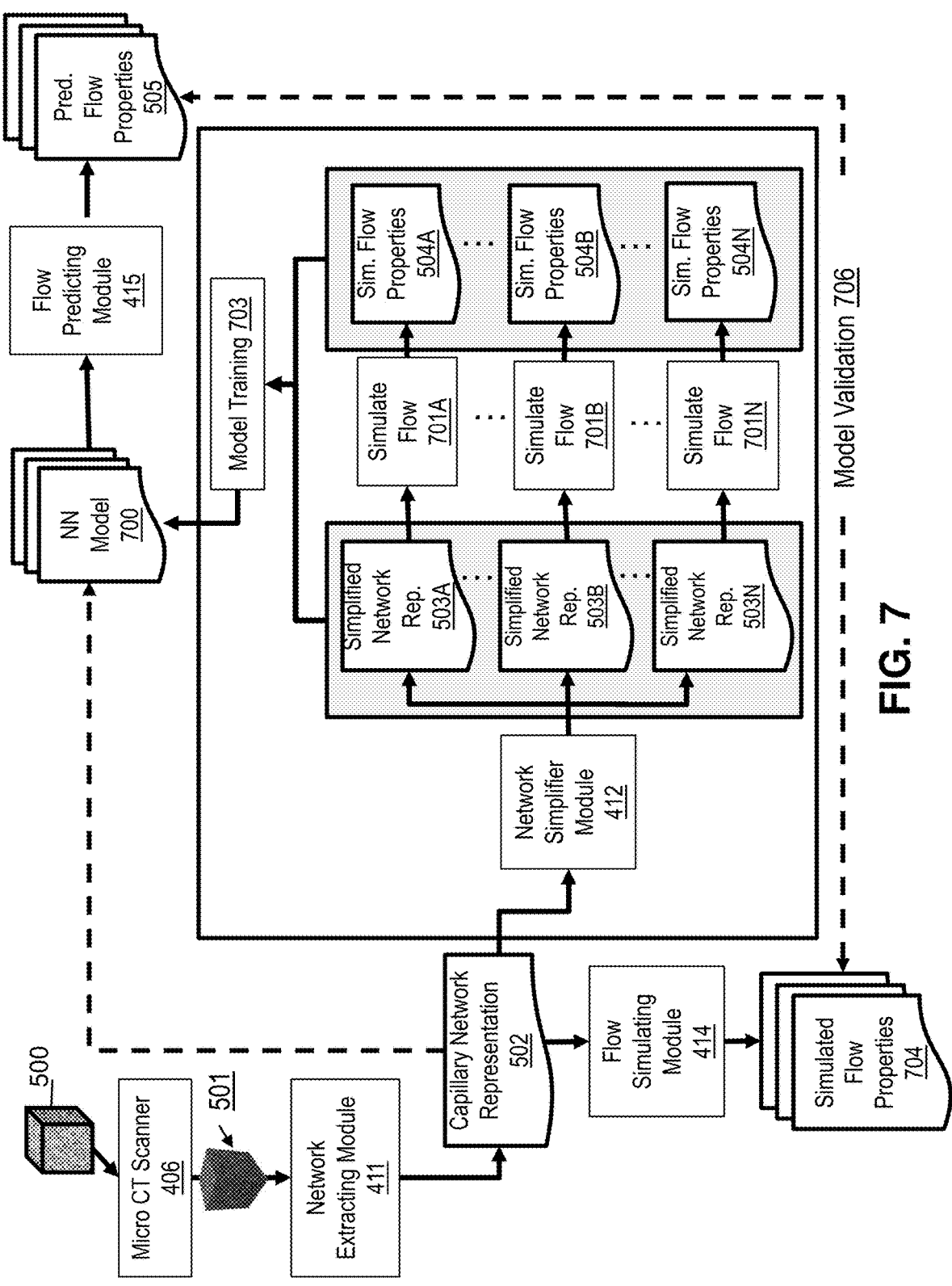
FIG. 7 is a flow diagram illustrating training of a NN model in accordance with embodiments of the invention.

FIG. 7 is a flow diagram illustrating training of a NN model in accordance with embodiments of the invention. Steps of FIG. 7 may be carried out in the environment of FIG. 4 and are described with reference to elements depicted in FIGS. 4 and 5.

As illustrated in FIG. 7, the porous medium sample 500 is input into and scanned by the micro-CT scanner 406, which outputs the 3D model 501 of the porous medium sample 500, which is input into the network extracting module 411 to generate the capillary network representation 502. During training of an NN model 700, the network simplifier module 412 generates a plurality of simplified network representations indicated at 503A-503N. In implementations, for each simulated network representation 503A-503N, fluid flow simulations are performed at 701A-701N (e.g., by the flow simulating module 414) to generate simulated flow properties 504A-504N for the respective simulated network representation 503A-503N. In one example, fifty (50) simulated network representations 503A-503N are generated by the network simplifier module 412 and analyzed by the flow simulating module 414 to determine a simulated permeability and a simulated porosity of each simulated network representation 503A-503N.

In implementations, the capillary network representation 502 is used as an input to the flow simulating module 414 to generate simulated flow properties 704 of the capillary network representation. The capillary network representation 502 is also used as input to the trained NN model 700 by the flow predicting module 415 to generate predicted flow properties 505 of the capillary network representation 502.

With continued reference to FIG. 7, in embodiments each simplified network representation 503A-503N is utilized as an input for training the NN model 700 at 703. Additionally, the simulated flow properties 504A-504N are utilized as model target inputs during the model training 703. Thus, embodiments of the invention utilize multiple simplified network representations 503A-503N (e.g., 50-100 representations) and their associated simulated flow properties to train the NN model 700. At step 706, validation of the trained NN model 700 is performed (e.g., by the NN module 413) by comparing the simulated flow properties 704 of the capillary network representation 502 to the predicted flow properties 505 to see how much they vary, wherein less variation indicates a more accurate NN model 700.

Figure 8:
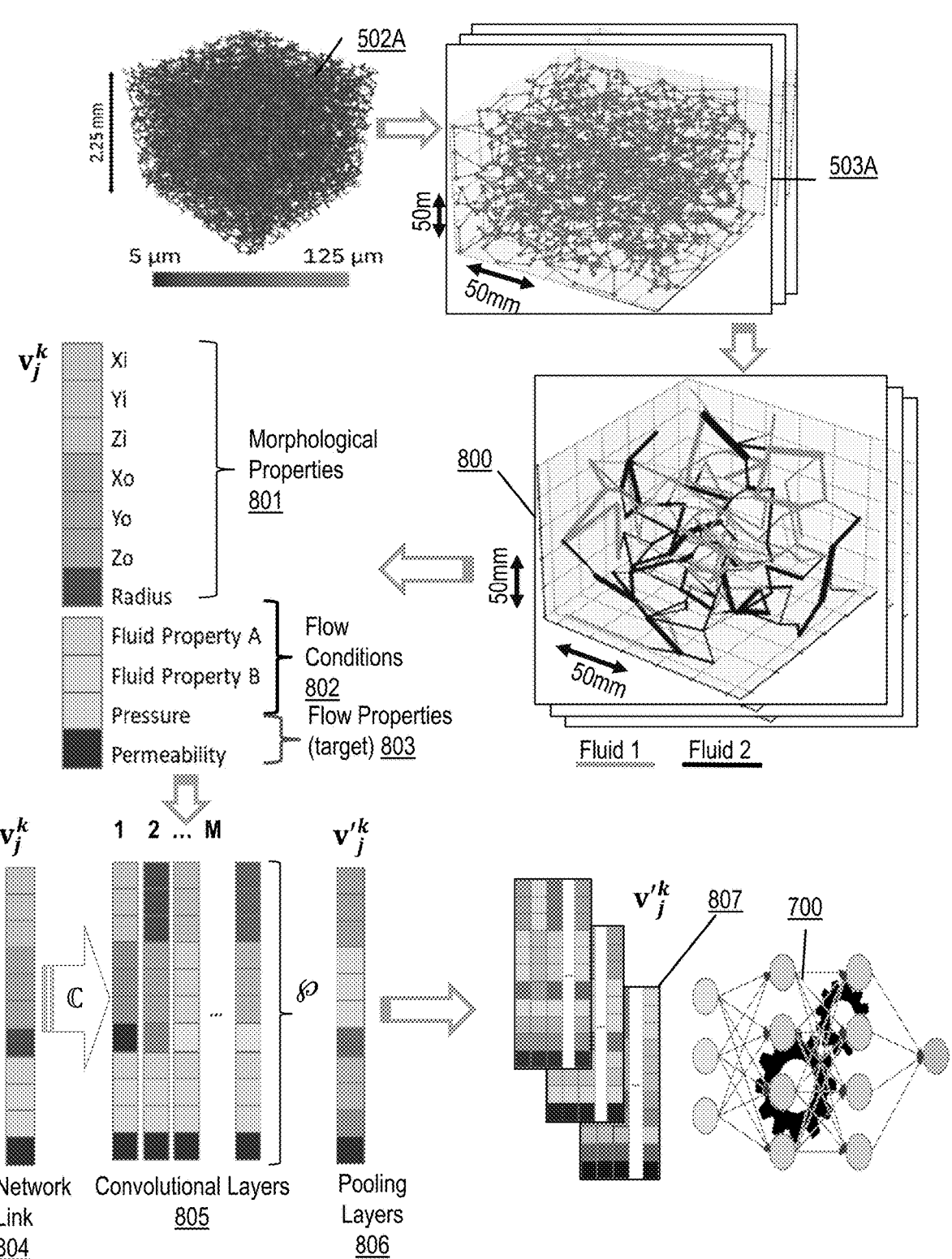
FIG. 8 illustrates neural network training for fluid flow prediction in accordance with embodiments of the invention.

FIG. 8 illustrates neural network training for fluid flow prediction in accordance with embodiments of the invention. Steps of FIG. 8 may be carried out in the environment of FIG. 4 and are described with reference to elements depicted in FIGS. 4 and 5.

FIG. 8 illustrates a set of N simplified network representations 503A generated from a capillary network representation 502A by the server 404 or the micro-CT scanner 406'. In this example, the number of nodes of the capillary network representation 502A is 1,885,585 and the number of links of the capillary network representation 502A is 2,763,271, wherein a node is an intersection between capillaries and a link is a capillary connecting two nodes in a capillary network. The number of nodes of the set of N simplified network representations 503A is 1394, and the number of links is 1846. It can be seen that the number of nodes in the capillary network representation 502A is 3 orders of magnitude greater than the number of nodes in the set of N simplified network representations 503A. Likewise the number of links in the capillary network representation 502A is 3 orders of magnitude greater than the number of links in the set of N simplified network representations 503A.

Simulated flow properties 800 are generated by the server 404 or the micro-CT scanner 406' from the plurality of network representations 503A for a first fluid (fluid 1) and a second fluid (fluid 2). The server 404 or the micro-CT scanner 406' identifies morphological properties of interest 801, along with flow conditions 802 and flow properties 803 (simulated flow properties). The flow properties 803 are utilized as model targets in the training of the NN model 700. In this example, the k-th network representation is set at k=1 . . . N, and each j-th network link 804 is characterized by a vector $$V_j^k.$$

Per the $$V_j^k$$

vector, M convolutions $\mathbb{C}$ are carried out with the surrounding link vectors $$V_i^k,$$

with i=1 . . . M, to generate convolutional layers 805, followed by a pooling operation represented at $\wp$ to generate pooling layers 806. The server 404 or the micro-CT scanner 406' generates the NN model 700 after the convolution $\mathbb{C}$ and pooling $\wp$ as indicated at 807, wherein k=1 . . . N number of simplified networks, and j=1 . . . P number of pooling elements per network.

Figure 9:
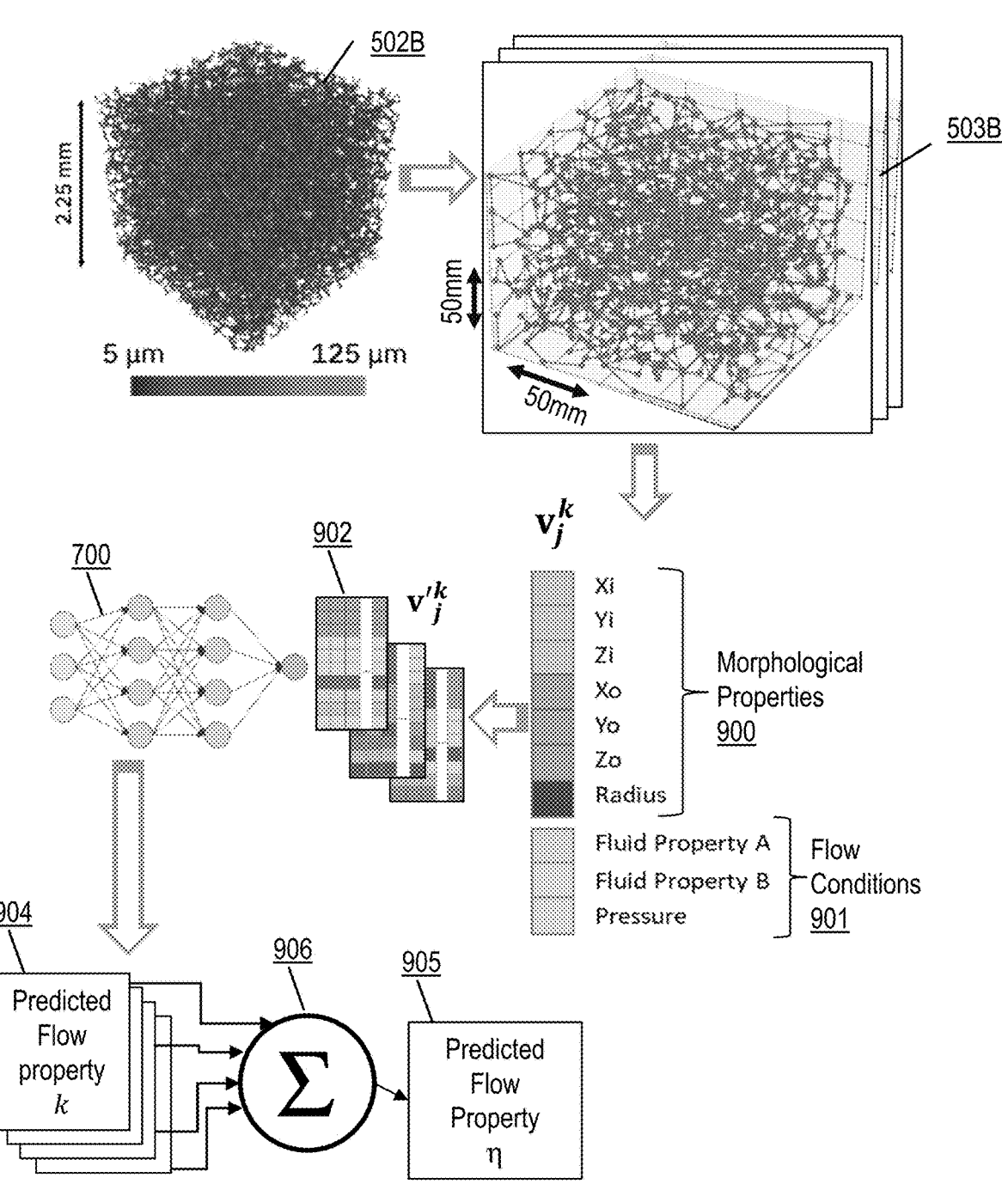
FIG. 9 illustrates fluid flow prediction utilizing a trained NN model in accordance with embodiments of the invention.

FIG. 9 illustrates fluid flow prediction utilizing a trained NN model in accordance with embodiments of the invention. Steps of FIG. 9 may be carried out in the environment of FIG. 4 and are described with reference to elements depicted in FIGS. 4 and 5.

FIG. 9 illustrates a set of N simplified network representations 503B generated from a capillary network representation 502B of a new porous rock sample by the server 404 or the micro-CT scanner 406'. In this example, the capillary network representation 502B includes 1,885,585 nodes and 2,763,271 links, and the set of N simplified capillary network representations 503B includes 1394 nodes and 1846 links. The simplified network representations 503B depict morphological properties 900 based on certain flow conditions 901. In this example, the k-th network representation is set at k=1 . . . N, and each j-th network link is characterized by a vector $V_j^k$. The application of the trained NN model 700 on the set of N simplified capillary network representations 503B is depicted at 902 (not showing the convolution and pooling), wherein k=1 . . . N number of simplified networks and j=1 . . . P number of pooling elements per network. The predicted flow properties 905 of the new rock sample are determined by aggregating the results (predicted flow property outputs) 904 from the trained NN model 700, as depicted at 906.

FIG. 10 shows a flowchart of an exemplary method in accordance with aspects of the present invention. Steps of the method may be carried out in the environment of FIG.

4 and are described with reference to elements depicted in FIGS. 4, 5 and 7. Initially, it is noted that steps of FIG. 10 may be implemented by a micro-CT scanner 406' that has been configured to perform steps according to embodiments of the invention, or may be implemented by a server 404 in communication with a micro-CT scanner 406 (e.g., a conventional micro-CT scanner).

At step 1000, the micro-CT scanner 406 or micro-CT scanner 406' generates a 3D image representing the spatial distribution of pore space of a porous medium sample (e.g., rock sample) 500. In implementations, the 3D image is a 3D image cube 501 illustrating morphology (e.g., pores) at the micron scale of the interior of the porous medium sample 500. In implementations, the micro-CT scanner 406 or 406' reconstructs the 3D image from serial cross-section images of the porous medium sample 500, wherein the cross-sections are generated from transmitting x-rays which pass through the porous medium sample 500 to reach a 2D area detector. Various types of micro-CT scanners may be utilized in the implementation of step 1000, and embodiments of the present invention are not intended to be limited to a particular micro-CT scanner. In embodiments, the imaging module 420 of the micro-CT scanner 406 or the imaging module 420' of the micro-CT scanner 406' implements step 1000.

At step 1001, the server 404 or the micro-CT scanner 406' generates a complete capillary network representation 502 of the pore space of the porous medium sample 500 based on the 3D image (e.g., 3D image cube 501) generated at step 1000. In general, the complete capillary network representation 502 represents the pore space of the porous medium sample 500 through geometrical primitives (e.g., cylinders and spheres), for which flow properties may be obtained. In embodiments, the server 404 receives the 3D image from the micro-CT scanner 406 prior to implementing step 1001. For example, the data collection module 410 of the server 404 may collect the 3D image generated by the imaging module 420 from the data storage module 421 of the micro-CT scanner 406 via the network 402.

In implementations, the network extracting module 411 or the network extracting module 411' utilizes a network extracting routine to process the 3D image generated at step 1000 to produce the complete capillary network representation 502, which represents the complete pore space of the 3D image. In general, the network extracting routine utilizes image processing techniques to process the 3D image to remove pores that are not connecting to a network of interconnecting pores comprising a flow path, and depicts the network of interconnecting pores of the 3D image as capillaries having a diameter.

One example of a network extracting routine includes the steps of: converting the 3D image to 8-bit gray scale, reducing image noise using a filter, and segmenting the noise-reduced grayscale image into solid and void space, leading to a binary image. In implementations, the network extracting routine further includes processing the binary image for morphological analysis and eliminating pore voxels that are not connected to a percolating network. In embodiments, the processed binary image data containing connected pore voxels is then input into a network extraction algorithm, such as a Pore Network Model (PNM), a Reduced Max Ball Model (RMB) or a Capillary Network Model (CNM), to generate the complete capillary network representation 502.

At step 1002, the server 404 or the micro-CT scanner 406' determines and stores at least one simulated flow property for the porous medium sample 500 based on the capillary network representation 502. In implementations, the server 404 or the micro-CT scanner 406' utilizes a flow simulating module 414 or 414' to initiate a physics-based flow simulating routine on the capillary network representation 502 to simulate the flow of a predetermined fluid under predetermined conditions (e.g., pressures, temperatures, etc.) through the capillaries of the capillary network representation 502, and generates flow properties of interest, such as porosity, permeability, flow rates, residual fluid saturation, or others. The at least one simulated flow property may be stored by the server 404 or the micro-CT scanner 406' for later use during validation of a trained NN module 700 (e.g., in the data storage module 416 or 416').

Various physics-based flow simulating routines may be utilized by the server 404 or the micro-CT scanner 406' to implement step 1002, and the invention is not intended to be limited to a particular flow simulating routine. In implementations, the physics-based flow simulating routine operates on nodes and links of the capillary network representation 502. In one example, a flow simulating routine applies Poiseuille's law to the links and mass conservation law to the interior nodes, while maintaining a fixed pressure difference between inlet and outlet boundary nodes. This is represented by a system of mass conservation equation $\Sigma_j$ $Q_{ij}=0$ for all nodes i, where $Q_{ij}=(\pi R_{ij}\ 4/8\ \mu L_{ij})\ (P_i-P_j)$ is the flow rate in the capillary that connects node i to node j. The geometrical parameters R and L, respectively, represent the radius and the length of a capillary (link) connecting two nodes of the network and $\mu$ is the dynamic viscosity of the fluid. In one example, a viscosity of $\mu=1$ cP is utilized, and a 10 kPa/m pressure gradient is applied along the flow direction in addition to atmospheric pressure. In this example, permeability is calculated using Darcy's Law $Q=K$ $(A/\mu L)\ \Delta P$.

At step 1003, the server 404 or the micro-CT scanner 406' generates a set of simplified network representations 503 based on the complete capillary network representation 502, wherein each of the simplified network representations 503 includes fewer capillaries than the complete capillary network representation 502. In implementations, the network simplifier module 412 of the server 404 or the network simplifier module 412' of the micro-CT scanner 406' implements a network simplification routine to generate the plurality of simplified network representations 502 at step 1003. In embodiments, the plurality of simplified network representations 502 are much smaller than the complete capillary network representation 502.

Examples of network simplification routines that may be utilized by the server 404 or the micro-CT scanner 406' include a capillary bundle routine, a regular capillary network routine, and a random capillary network routine.
Capillary Bundle Routine A capillary bundle with length Lx is distributed in a sample with dimensions Lx, Ly and Lz. The sample volume is defined as the product LxLyLz. The capillary diameters are assigned by randomly choosing the diameter from the diameter probability distribution function. The diameter probability distribution function is obtained from the complete capillary network representation 502. Once the above steps are completed, the porosity of each simplified network representation is calculated at step 1004 by dividing the capillary volume by the sample volume. The capillary bundle routine repeats these steps until reaching a very similar porosity to that of the complete capillary network representation 502. In that sense, the set of simplified network representations 503 preserves the following properties: (i) porosity; and (ii) capillary diameter distribution.

Regular Capillary Network Routine

In the regular capillary network routine, a 2D or 3D cubic complete capillary network representation 502 is created. The intersection between capillaries, called a node, show 4 or 8 in 2D, or 6 or 12 coordination number in 3D (number of capillaries intersecting), depending on the regular network chosen. In these simplified capillary networks, the capillary length is fixed (because it is a regular network). Other parameters such as capillary diameter and node coordination number follow the same probability distribution function as the sample medium's complete capillary network representation 502. To fulfill these requirements, the capillary diameters are assigned randomly by choosing the diameter from the probability distribution function. A similar procedure is done to obtain the node coordination number. As the coordination number is a priori fixed by the choice of simplified regular network, some capillaries are deleted to match the coordination number probability distribution function. Once all the above steps are completed, the porosity of the set of simplified network representations 503 is calculated by dividing the capillary volume by the sample volume. The regular capillary network routine repeats these steps until reaching a very similar porosity to that of the sample medium's original complete capillary network representation 502. In that sense, the simplified network preserves the following properties: (i) porosity; (ii) capillary diameter distribution; and (iii) node coordination number distribution.

Random Capillary Network Routine

In the random capillary network routine, a 2D or 3D set of points (or nodes) are randomly distributed in a 2D or 3D space delimited by Lx, Ly and Lz (if 3D). Then, these nodes are connected. The connection between these nodes are called capillaries. Once the nodes are randomly distributed, the capillary length does not follow the capillary length frequency distribution function as the sample medium's original complete capillary network representation 502. On the other hand, the parameters capillary diameter and node coordination number follow the same frequency distribution function as the sample medium's original complete capillary network representation 502. To generate a simplified random capillary network, the capillary diameters are assigned by randomly choosing the diameter from the diameter frequency distribution function. A similar procedure is done to obtain the node coordination number. As the coordination number is a priori fixed by the number of connections (or capillaries) between nodes, some capillaries are deleted to match the coordination number frequency distribution function. Once all the above steps are completed, the porosity of each simplified network is calculated by dividing the capillary volume by the sample volume. The random capillary network routine repeats these steps until reaching a porosity value within a predefined error margin to that of the sample medium's original complete capillary network representation 502. In that sense, the simplified network preserves the following properties: (i) porosity; (ii) capillary diameter distribution; and (iii) node coordination number distribution.

With continued reference to FIG. 10, at step 1004, the server 404 or the micro-CT scanner 406' determines and stores at least one simulated flow property 504 of each simplified network representation in the set of simplified network representations 503. In implementations, the server 404 or the micro-CT scanner 406' utilizes the flow simulating modules 414 or 414' to initiate a physics-based flow simulating routine on each of the simplified network representations to simulate the flow of a predetermined fluid under predetermined conditions (e.g., pressures, temperatures, etc.) through the capillaries of the respective simplified network representations, and generates flow properties of interest, such as porosity, permeability, flow rates, and residual fluid saturation. The at least one simulated flow property 504 may be stored by the server 404 or the micro-CT scanner 406'. Various physics-based flow simulating routines may be utilized by the server 404 or the micro-CT scanner 406' to implement step 1004, and the invention is not intended to be limited to a particular flow simulating routine.

At step 1005, the server 404 or the micro-CT scanner 406' creates and/or trains the NN model 700 using the set of simplified network representations 503 and the determined simulated flow properties 504 of the simplified network representations as training inputs. In implementations, the NN module 413 of the server 404 or the NN module 413' of the micro-CT scanner 406' utilizes the set of simplified network representations 503 as model inputs and their simulated flow properties as model targets to create and/or train the NN model 700.

It should be understood that a NN model 700 for determining flow characteristics that requires thousands of full capillary network flow simulations for training purposes would be impractical, as it would be much cheaper and faster (from a computer resource perspective) to perform flow simulations directly on the capillary network (e.g., capillary network representation 502). Embodiments of the invention solve this technical problem by providing a method of training the NN model 700 using smaller, simplified capillary networks (e.g., simplified network representations 503) to build a training dataset for the NN model 700, which can later be applied to a complete capillary network representation at runtime. The execution of a flow simulation in the simplified capillary networks is vastly cheaper from a computer resource perspective than running a flow simulation directly in the complete capillary network.

At step 1006, the server 404 or the micro-CT scanner 406' generates predicted flow properties of the porous medium sample 500 by inputting the complete capillary network representation 502 into the NN model 700. In implementations, the flow prediction module 415 of the server 404 or the flow prediction model 415' of the micro-CT scanner 406' feed the capillary network representation 502 to the NN model 700, and an evaluation routine of the NN model 700 outputs the predicted flow properties.

At step 1007, the server 404 or the micro-CT scanner 406' validates the NN model 700 by comparing the simulated flow properties determined at step 1004 and the predicted flow properties determined at step 1006 to determine variations. In embodiments, when the variation between the simulated flow properties and the predicted flow properties is over a predetermine threshold value, the server 404 or micro-CT scanner 406' determines that modifications to the NN model 700 and/or further training of the NN model 700 are required. In implementations, the NN module 413 of the server 404 or the NN module 413' of the micro-CT scanner 406' implements step 1007.

In implementations, if the server 404 or the micro-CT scanner 406' determine that the NN model 700 is not valid, steps 1003-1007 may be repeated until the variation between the simulated flow properties determined at step 1004 and the predicted flow properties is below a predetermine threshold value. Once the NN model 700 is determined to be valid, the method may progress to step 1008.

At step 1008 the server 404 or the micro-CT scanner 406' generates a new capillary network representation of a new porous medium sample. Step 1008 may be performed utilizing the same methods as step 1001.

At step 1009, the server 404 or the micro-CT scanner 406' inputs the new capillary network representation generated at step 1008 into the trained NN model 700 to generate predicted flow properties of the new porous medium sample as outputs.

At step 1010, the server 404 or the micro-CT scanner 406' aggregates the predicted flow properties of the new porous medium sample to generate a report of the flow properties of the new porous medium sample. In embodiments, the flow predicting module 415 of the server 404 or the flow predicting module 415' of the micro-CT scanner 406' implements step 1010.

At step 1011, the server 404 or the micro-CT scanner 406' displays the report to a user via a user interface of the server 404 or a user interface of the micro-CT scanner 406'. In embodiments, the flow predicting module 415 of the server 404 or the flow predicting module 415' of the micro-CT scanner 406' implements step 1011. In aspects of the invention the server 404 or the micro-CT scanner 406' provides NN model results to one or more client devices 408 via the network 402 for display by a user interface.

An exemplary use scenario will now be discussed with reference to FIG. 10. In accordance with step 1000, a porous medium sample (rock sample) 500 is imaged at sub-microscopic resolution by the imaging module 420 of the micro-CT scanner 406, thereby capturing a 3D model with a volume of 10 mm$^3$ or more. The server 404 obtains the 3D model 501, and the network extracting module 411 generates a capillary network representation 502 based on the 3D model 501 in accordance with step 1001. In this example, the capillary network representation 502 contains millions ($10^6$-$10^8$) of capillaries, rendering a complete flow simulation of the capillary network representation 502 by the flow simulating module 414 unfeasible or too computationally expensive. The network simplifier module 412 of the server 404 generates a set of simplified network representations 503 comprising thousands ($10^3$-$10^5$) of simplified capillary networks containing a reduced number of capillaries ($10^2$-$10^4$) compared to the capillary network representation 502, according to step 1003. The flow simulating module 414 of the server 404 performs flow simulations on the set of simplified network representations 503 in accordance with step 1004, which has a much smaller computational cost than performing a flow simulation of the capillary network representation 502.

In this example, multiphase fluid properties such as viscosity, density, interfacial tension, contact angle, temperature, pressure, and boundary conditions are provided as input to a flow simulation algorithm of the flow simulating module 414. For each instance of the thousands of simplified network representations 503, a flow simulation is executed by the flow simulating module 414 and relevant properties of interest are extracted, such as absolute or relative permeability. Based upon this compilation of simplified networks (set of simplified network representations 503) and their simulated flow properties 504, a NN model 700 is trained according to step 1005. A suitable architecture for the NN model 700 is a graph convolutional neural network (GCNN). In implementations, a trained GCNN model can be used to replace the full flow simulation performed by the flow simulating module 414, and will instead predict the desired flow properties (e.g., predicted flow properties 505) based on the complete capillary network representation 502 and the multiphase fluid properties, or based on a set of simplified network representations 503 of the complete capillary network representation 502.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

accessing, by a computing device, a capillary network representation of a porous medium sample;

generating, by the computing device, a set of simplified network representations from the capillary network representation;

determining, by the computing device, simulated fluid flow properties of each of the simplified network representations using a simulator to perform fluid flow simulations; and training, by the computing device, a convolutional neural network (NN) model utilizing the set of simplified network representations as inputs and the simulated fluid flow properties as model targets, thereby generating a trained convolutional NN model for predicting fluid flow properties of the porous medium sample, wherein the trained convolutional NN model comprises a model that performs convolutions with link vectors to generate convolutional layers followed by a pooling operation to generate pooling layers.

2. The method of claim 1, wherein the capillary network representation is a three-dimensional (3D) network of interconnected capillaries representing interconnecting pore structures of a 3D micro-CT scanner model of a porous medium sample, and further comprising obtaining, by the computing device, the 3D micro-CT scanner model from a remote micro-CT scanner via a network connection.

3. The method of claim 1, wherein the capillary network representation is a three-dimensional (3D) network of interconnected capillaries representing interconnecting pore structures of a 3D micro-CT scanner model of a porous medium sample, and further comprising generating, by the computing device, the 3D micro-CT scanner model by imaging the porous medium sample with micro-CT.

4. The method of claim 1, wherein the capillary network representation is a three-dimensional (3D) network of interconnected capillaries representing interconnecting pore structures of a 3D micro-CT scanner model of a porous medium sample, and further comprising generating, by the computing device, the capillary network representation from the 3D micro-CT scanner model.

5. The method of claim 1, further comprising:

determining, by the computing device, predicted fluid flow properties of the porous medium sample by inputting the capillary network representation into the trained convolutional NN model;

aggregating, by the computing device, the simulated fluid flow properties of each of the simplified network representations to obtain simulated fluid flow property results for the porous medium sample; and validating, by the computing device, the trained convolutional NN model by comparing the simulated fluid flow property results for the porous medium sample to the predicted fluid flow properties of the porous medium sample, wherein variation of the simulated flow properties from the predicted flow properties exceeding a predetermined threshold value indicates an error in the trained convolutional NN model.

6. The method of claim 1, further comprising: inputting, by the computing device, a new capillary network representation of a new porous medium sample into the trained convolutional NN model, thereby generating predicted fluid flow properties of the new porous medium sample, wherein the new capillary network representation comprises a single capillary network representation of the complete new porous medium sample, or a set of simplified capillary network representations of the new porous medium sample.

7. The method of claim 1, wherein the simulated fluid flow properties and the predicted fluid flow properties comprise one or more fluid flow properties selected from the group consisting of: porosity, permeability, flow rates, and residual fluid saturation.

8. The method of claim 1, wherein the convolutional neural network comprises a graph convolutional neural network (GCNN) and the computing device includes software provided as a service in a cloud environment.

9. A computer program product comprising one or more computer non-transitory readable storage media having program instructions collectively stored on the one or more computer readable storage media, the program instructions executable to:

access a capillary network representation, wherein the capillary network representation is a three-dimensional (3D) network of interconnected capillaries representing interconnecting pore structures of a 3D micro-CT scanner model of a porous medium sample;

generate a set of simplified network representations from the capillary network representation, wherein each simplified network representation in the set of simplified network representations comprises a two dimensional (2D) or 3D network of interconnected capillary structures that represents a subset of the interconnected capillary structures of the capillary network representation;

perform fluid flow simulations, using a physics-based simulator, to provide simulated fluid flow properties of each of the simplified network representations; and train a convolutional neural network (NN) model utilizing the set of simplified network representations as inputs and the simulated fluid flow properties as model targets, thereby generating a convolutional trained NN model for predicting fluid flow properties, wherein the trained convolutional NN model comprises a convolutional neural network model that performs convolutions with link vectors to generate convolutional layers followed by a pooling operation to generate pooling layers.

10. The computer program product of claim 9, wherein the program instructions are further executable to obtain the 3D micro-CT scanner model from a remote micro computed tomography (micro-CT) scanner via a network connection.

11. The computer program product of claim 9, wherein the program instructions are further executable to generate the 3D micro-CT scanner model by imaging the porous medium sample with micro-CT.

12. The computer program product of claim 9, wherein the program instructions are further executable to generate the capillary network representation from the 3D micro-CT scanner model.

13. The computer program product of claim 9, wherein the program instructions are further executable to:

determine predicted fluid flow properties of the porous medium sample by inputting the capillary network representation into the trained convolutional NN model;

aggregate the simulated fluid flow properties of each of the simplified network representations to obtain simulated fluid flow property results for the porous medium sample; and validate the trained convolutional NN model by comparing the simulated fluid flow property results for the porous medium sample to the predicted fluid flow properties of the porous medium sample.

14. The computer program product of claim 9, wherein the program instructions are further executable to input a new capillary network representation of a new porous medium sample into the trained convolutional NN model, thereby generating predicted fluid flow properties of the new porous medium sample, wherein the new capillary network representation comprising a single capillary network representation of the complete new porous medium sample, or a set of simplified capillary network representations of the new porous medium sample.

15. The computer program product of claim 9, wherein the set of simplified network representations have a number of interconnected capillary structures that is smaller than a number of interconnected capillary structures of the capillary network representation by orders of magnitude.

16. A system comprising:

a processor, a computer readable memory, one or more computer readable storage media, and program instructions collectively stored on the one or more computer readable storage media, the program instructions executable to:

access a capillary network representation, wherein the capillary network representation is a three-dimensional (3D) network of interconnected capillaries representing interconnecting pore structures of a 3D micro-CT scanner model of a porous medium sample;

generate a set of simplified network representations from the capillary network representation, wherein each simplified network representation in the set of simplified network representations comprises a two dimensional (2D) or 3D network of interconnected capillary structures that represents a subset of the interconnected capillary structures of the capillary network representation;

determine simulated fluid flow properties of each of the simplified network representations using a physics-based simulator to perform fluid flow simulations;

generate one or more convolutional layers by performing one or more convolutions on vectors characterizing links of the set of simplified network representations;

train a convolutional neural network (NN) model utilizing the set of simplified network representations as inputs and the simulated fluid flow properties as model targets, thereby generating a trained convolutional NN model for predicting fluid flow properties, wherein the trained convolutional NN model performs convolutions with link vectors to generate convolutional layers followed by a pooling operation to generate pooling layers; and input a new capillary network representation of a new porous medium sample into the trained convolutional NN model, thereby generating predicted fluid flow properties of the new porous medium sample.

17. The system of claim 16, wherein the program instructions are further executable to display, by the computing device, the predicted fluid flow properties to a user via a user interface.

18. The system of claim 16, wherein the program instructions are further executable to:

generate the 3D micro-CT scanner model by imaging the porous medium sample with micro-CT; and generate the capillary network representation from the 3D micro-CT scanner model.

19. The system of claim 16, wherein the program instructions are further executable to:

determine predicted fluid flow properties of the porous medium sample by inputting the capillary network representation into the trained convolutional NN model;

aggregate the simulated fluid flow properties of each of the simplified network representations to obtain simulated fluid flow property results for the porous medium sample; and validate the trained convolutional NN model by comparing the simulated fluid flow property results for the porous medium sample to the predicted fluid flow properties of the porous medium sample.

20. The system of claim 16, wherein the set of simplified network representations have a number of interconnected capillary structures that is smaller than a number of interconnected capillary structures of the capillary network representation by orders of magnitude.

* * * * *